(12) United States Patent
Bohme (10) Patent No.: US 12,038,049 B2
(45) Date of Patent: Jul. 16, 2024

(54) METHOD FOR WITHDRAWAL OF A BEARING FROM A GATE MECHANISM

(71) Applicant: Siemens Mobility, Inc., New York, NY (US)

(72) Inventor: Richard C. Bohme, Louisville, KY (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 18/315,632

(22) Filed: May 11, 2023

(65) Prior Publication Data
US 2023/0279903 A1  Sep. 7, 2023

Related U.S. Application Data

(62) Division of application No. 17/306,117, filed on May 3, 2021, now abandoned.

(51) Int. Cl.
*F16C 43/02* (2006.01)
*B61L 29/04* (2006.01)

(52) U.S. Cl.
CPC .............. *F16C 43/02* (2013.01); *B61L 29/04* (2013.01)

(58) Field of Classification Search
CPC ...... F16C 39/02; F16C 43/02; F16C 2237/00; B25B 27/062
See application file for complete search history.

(56) References Cited

FOREIGN PATENT DOCUMENTS

JP         2001050290 A   *   2/2001   ............... F16C 23/08

OTHER PUBLICATIONS

Machine translation of JP 2001-050290 A (Year: 2001).*

* cited by examiner

*Primary Examiner* — Christopher J. Besler (57) ABSTRACT

There are disclosed methods for withdrawal of a bearing from a gate mechanism including a mechanism housing, a carrier assembly, and discrete fasteners. The carrier assembly includes a carrier housing and a carrier bearing. The carrier bearing is supported for rotation within the carrier housing. The carrier housing has a carrier support mating with a receiving bore of the mechanism housing. The carrier housing has multiple flange fasteners aligning with housing fasteners and housing surfaces of the mechanism housing when the carrier housing mates with the receiving bore. Multiple discrete fasteners are removed from a first group of the flange fasteners aligned with the housing fasteners. The carrier assembly is displaced from the mechanism housing in response to inserting the plurality of discrete fasteners to a second group of the plurality of flange fasteners aligned with the plurality of housing surfaces.

6 Claims, 9 Drawing Sheets

METHOD FOR WITHDRAWAL OF A BEARING FROM A GATE MECHANISM

RELATED APPLICATION

This patent document claims priority under 35 U.S.C. § 120 and all other benefits from U.S. application Ser. No. 17/306,117, titled "Apparatus and Method for Withdrawal of a Bearing from a Gate Mechanism," filed May 3, 2021, the content of which is hereby incorporated by reference to the extent permitted by law.

FIELD OF THE INVENTION

This application relates to the field of gate control systems at railroad/highway crossings and, more particularly, to a gate mechanism having replaceable shaft bearings.

BACKGROUND

Main shaft bearings of conventional highway crossing gates are near impossible to remove without total disassembly of gate crossing mechanisms of the crossing gates. Changes to a main shaft bearing require many external parts of the gate crossing mechanism need to be removed from the main shaft. In addition, replacement of a main shaft bearing requires removal of a corresponding main shaft and complete disturbance of internal components as well as field adjustments for the location. Electrical components and mechanical assemblies are disconnected and removed in order to gain access other parts of the gate crossing mechanism. Sometimes, the use of a torch or hammer is needed to shift or otherwise move mechanical parts in order to allow removal of the main shaft bearing. Hand clearance may also be necessary in order to reach inside the housing of the gate crossing mechanism for various reasons, such as manually pushing the bearing out of the housing. Once the main shaft bearing is replaced, the whole disassembly process is reversed with special care to reassemble the internal and external parts of the crossing gate. Further, functional testing and adjusting are required before placing the crossing gate back in service.

Accordingly, main shaft bearings of conventional highway crossing gates are difficult to replace in the field. Much disassembly is required, and a substantial amount of time is necessary to reassemble and make internal adjustments to vital operation parts.

SUMMARY

In accordance with one embodiment of the disclosure, there is provided an approach for replacement of a bearing of a shaft of a gate mechanism without the need to remove the shaft from the mechanism, thus leaving most or all internal components and settings in place. The housing design saves a great deal of time, particularly where a bearing needs to be serviced in the field. Bearings may wear over time but also see shock damage from vehicles hitting the gate arm. Conventional methods to replacement of bearings requires much disassembly and reassembly time as well as internal adjustment of vital operational parts, such as cams and contacts. The approach disclosed herein utilizes a custom bearing carrier assembly to facilitate withdrawal of a bearing assembly along a shaft and out a housing. Advantages of the approach include time savings, risk reduction, minimal adjustment of cams, minimal movement of vital components on the shaft, and serviceability even if the segment gear is frozen on the shaft.

An aspect is a method for withdrawal of a bearing from a gate mechanism. A mechanism housing of the gate mechanism is established. The mechanism housing includes a receiving bore, multiple housing fasteners, and multiple housing surfaces. The housing fasteners are located about a periphery of the receiving bore, and the housing surfaces are located about the periphery of the receiving bore offset from the housing fasteners. A bearing carrier assembly is also established. The bearing carrier includes a carrier housing and a carrier bearing. The carrier bearing is supported within the carrier housing for rotation within the carrier housing. The carrier housing has a carrier support mating with the receiving bore. The carrier housing has multiple flange fasteners aligning with the housing fasteners and the housing surfaces when the carrier housing mates with the receiving bore. Multiple discrete fasteners are removed from a first group of the flange fasteners aligned with the housing fasteners. The discrete fasteners are inserted to a second group of the flange fasteners aligned with the housing surfaces. The bearing carrier assembly is displaced from the mechanism housing.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIGS. 4A and 4B are perspective views of a bearing carrier assembly, supported by the gate mechanism of FIG. 2, in which FIG. 4A is a composite view and FIG. 4B is an exploded view.

DETAILED DESCRIPTION

Various technologies that pertain to systems and methods that facilitate replacement of a bearing of a gate mechanism, without the need to remove a shaft of the bearing from the gate mechanism, will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The systems and methods facilitating replacement of the bearing provide for withdrawal of the bearing from the gate mechanism out in the field if necessary. Conventional gate mechanisms require substantial disassembly and reassembly time and effort as well as internal adjustments of vital operational parts, such as cams and contacts. The systems for withdrawal of the bearing include a mechanism housing with a bearing bore large enough to accommodate a bearing carrier assembly. The bearing carrier assembly includes tapped holes in its flange that may be used to push or otherwise displace the bearing carrier assembly along the shaft central to the bearing and out of the mechanism housing.

Figure 1:
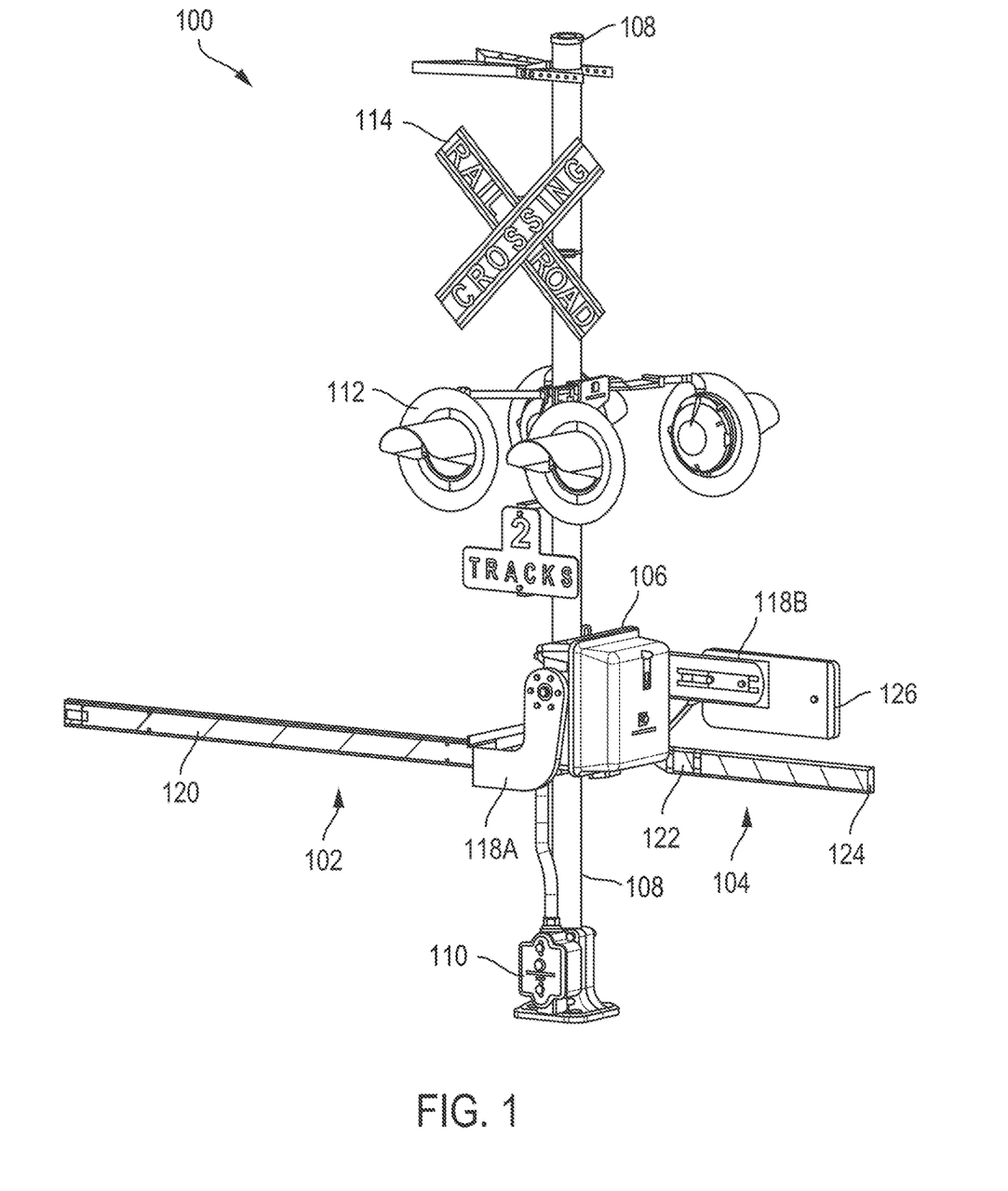
FIG. 1 illustrates of an environment, having a railroad crossing gate, in an example implementation that is operable to employ techniques described herein.

FIG. 1 illustrates of an environment in an example implementation that is operable to employ techniques described herein. In particular, a railroad crossing gate 100 shown in a lowered or substantially horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 102 and pedestrian gate 104. The roadway gate 102 and pedestrian gate 104 may be raised and lowered by a gate crossing mechanism 106. The gate crossing mechanism 106 provides efficiency and versatility to the operation of the railroad crossing gate 100, including entrance and/or exit gate configuration options. The gate crossing mechanism 106 may be an integral part of a Wayside Information System (WIS) and Wayside Alarm Management System (WAMS) and report data back to an event recorder located along a wayside associated with such systems.

The example railroad crossing gate 100 also includes a pole or mast 108 supported at its base by a foundation or ground surface. The mast 108 supports a junction box 110 to provide electrical and electronic connections for the gate crossing mechanism 106 and other electrical/electronic components of the crossing gate 100, such as flashing signal lights 112. The mast 108 may further support one or more mechanical components such as a railroad crossing sign 114 and/or a track sign 116. The gate crossing mechanism 106 is attached to the mast 108 and is used to raise and lower the roadway and/or pedestrian gates 102, 104. The illustrated railroad crossing gate 100 is often referred to as a combined crossing gate. When a rail vehicle approaches the crossing, the railroad crossing gate 100 may provide a visual warning using the signal lights 112, railroad crossing sign 114, and/or track sign 116. The gate crossing mechanism 106 will lower the roadway gate 102 and the pedestrian gate 104 to respectively restrict traffic and pedestrians from crossing the track until the rail vehicle has passed.

As shown in FIG. 1, the roadway gate 102 comprises first and second counterweight support arms 118A, 118B in which the first counterweight support arm 118A attaches a roadway gate arm 120 to the gate crossing mechanism 106. The pedestrian gate 104 comprises a pedestrian gate support 122 connecting a pedestrian gate arm 124 to the gate crossing mechanism 106. Each counterweight support arm may be a short counterweight support arm or a long counterweight support arm, in which one or more counterweights 126 may be attached the long counterweight support arm(s). For example, the counterweights 126 may be positioned at a long counterweight support arm opposite a support arm corresponding to the roadway gate arm 120 to counterbalance the weight structure of the roadway gate arm. When raised, the roadway and pedestrian gates 102, 104 are positioned so that they do not interfere with either roadway or pedestrian traffic. This position is often referred to as the vertical position, which is not necessarily exactly vertical relative to the ground. A "power-on" braking mechanism or other powered holding device (internal to the gate crossing mechanism 106) is used to hold the gates 102, 104 when they are in the substantially vertical position. The roadway and pedestrian gates 102, 104 are raised and lowered between the substantially horizontal and vertical positions by the gate crossing mechanism 106, 200.

Figure 2:
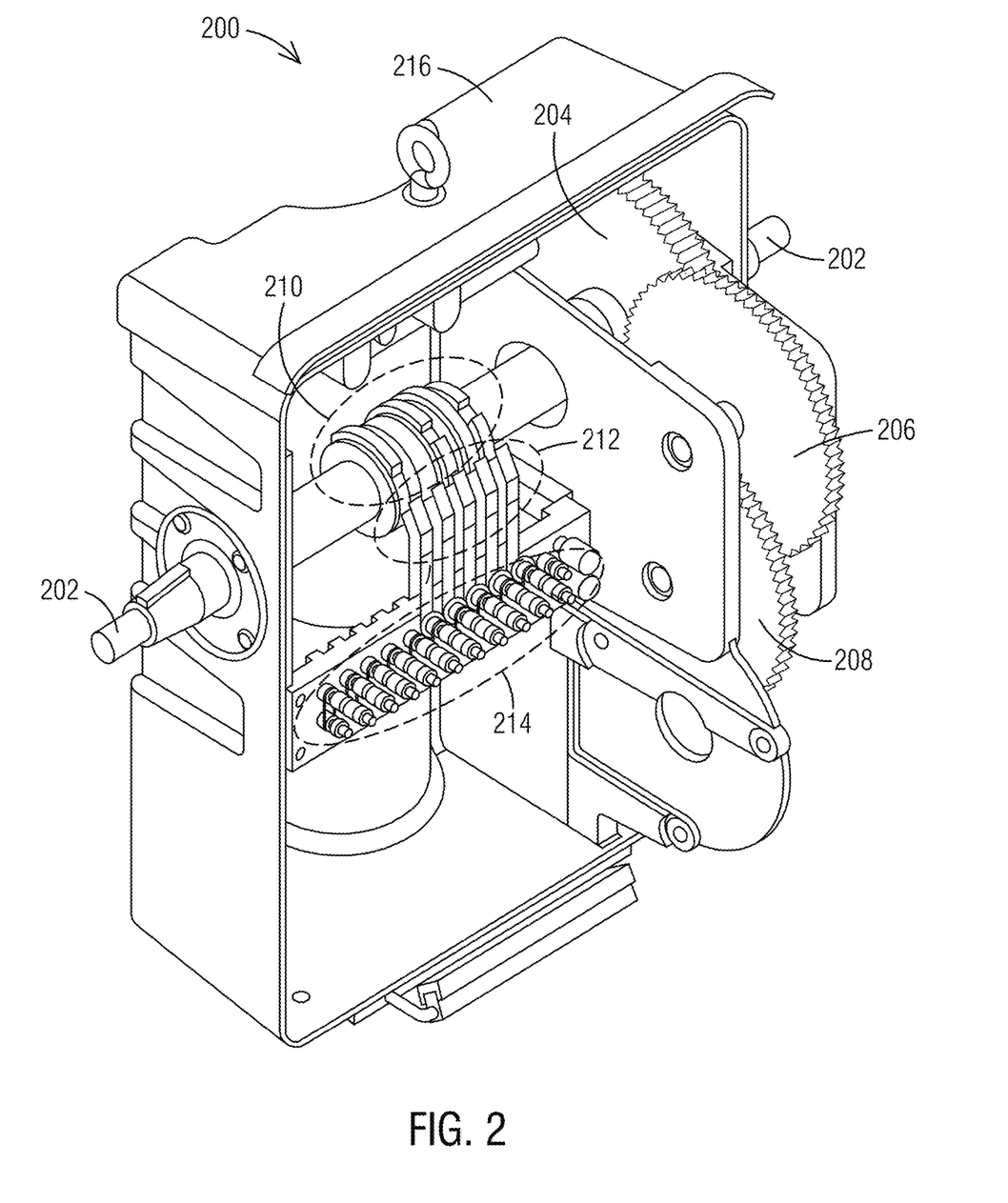
FIG. 2 is a partial perspective view of the gate mechanism of FIG. 1 in an example implementation that is operable to employ the techniques described herein.

Referring to FIG. 2, a gate mechanism 200 (such as the gate crossing mechanism 106 of FIG. 1) includes a shaft 202 connected to the counterweight support arms 118A, 118B and, for some embodiments, connected to the pedestrian gate support 122 as well. The gate mechanism 200 further includes various electrical and mechanical components to drive and control the shaft 202, such as a segment gear 204 coupled to the shaft, upper and lower gears and pinions 206, 208 operating in conjunction with the segment gear 204, shaft cams 210 coupled to the shaft away from the segment gear, shaft contacts 212 responsive to position and/or movement of the shaft and the shaft cams, and a terminal board assembly 214 for connections with other devices. The interaction of these components is important to the operation of the railroad crossing gate 100. For example, the shaft cams 210 are positioned on the shaft 202 such that they open and close shaft contacts 212 at various angles of the shaft and corresponding gate arm(s) 120, 124. Other components of the gate mechanism 200 include a motor assembly to drive the gearing 204, 206, 208, stop bar, defroster, upper and lower buffer assembly, and electrical/electronic control circuits, and various electrical wiring, which are not shown in FIG. 2 to facilitate an understanding of the general operation of the shaft 202. A housing 216 of the gate mechanism 200 supports the components of the gate mechanism and provides protection for at least some components from elements external to the gate mechanism.

Figure 3A:
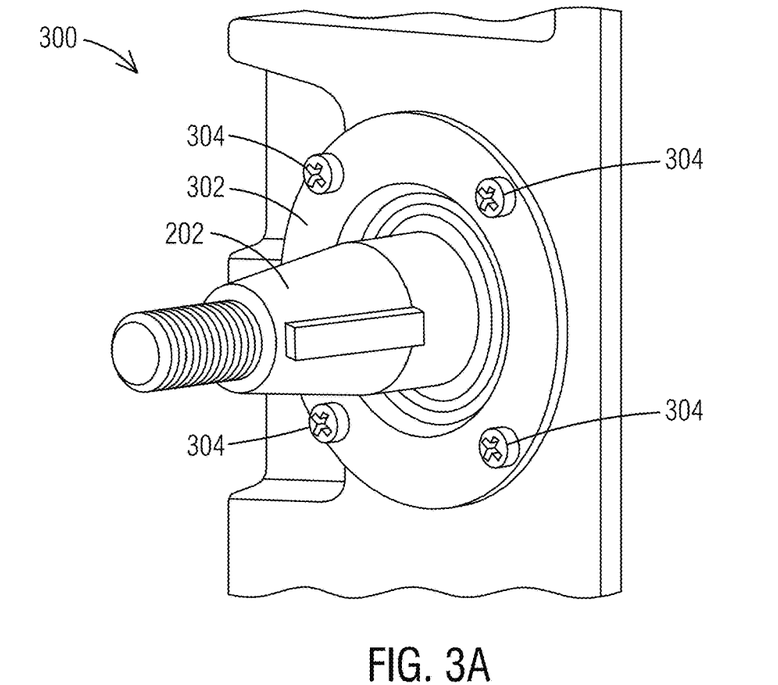
FIGS. 3A and 3B are perspective views of a portion of the gate mechanism of FIG. 2 in example implementations.
Figure 3B:
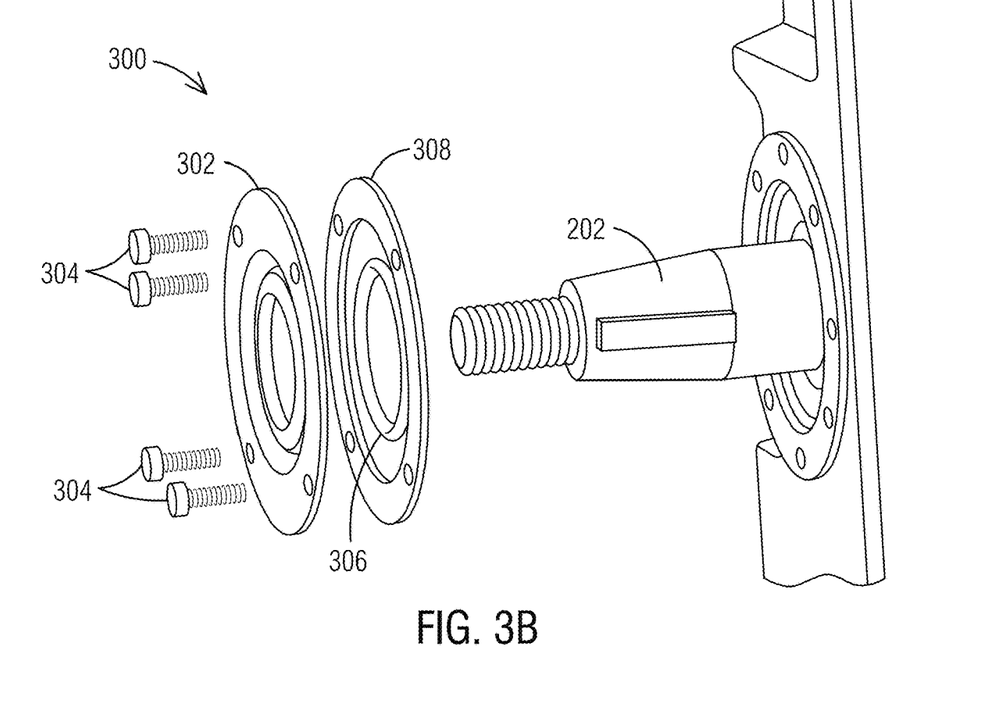

Referring to FIGS. 3A and 3B, there are shown an end portion 300 of the shaft 202 and its associated components. The external parts of the gate mechanism 200 are displaced to expose inner components adjacent to the end portion 300 of the shaft 202. The external parts of the gate mechanism 200 include a bearing retaining plate 302 and discrete fasteners 304. The external parts may also include other components to facilitate the operation, and otherwise support, the shaft 202 and/or its associated components, such as an O-ring 306 and seal plate gasket 308, which are also displaced from the area around the shaft 202. The discrete fasteners 304 are removed from the bearing retaining plate 302, and the bearing retaining plate, O-ring 306, and seal plate gasket 308 are removed from the end of the shaft 202.

Figure 4A:
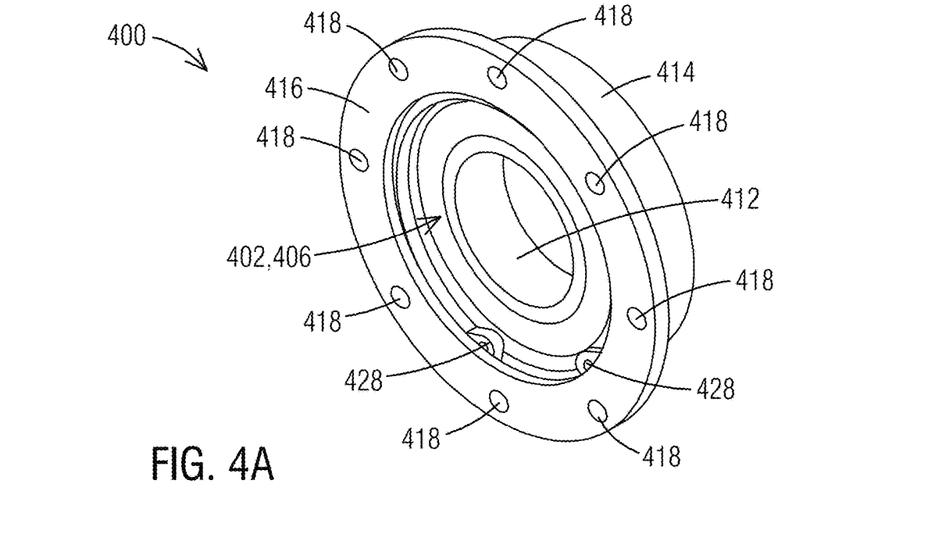
Figure 4B:
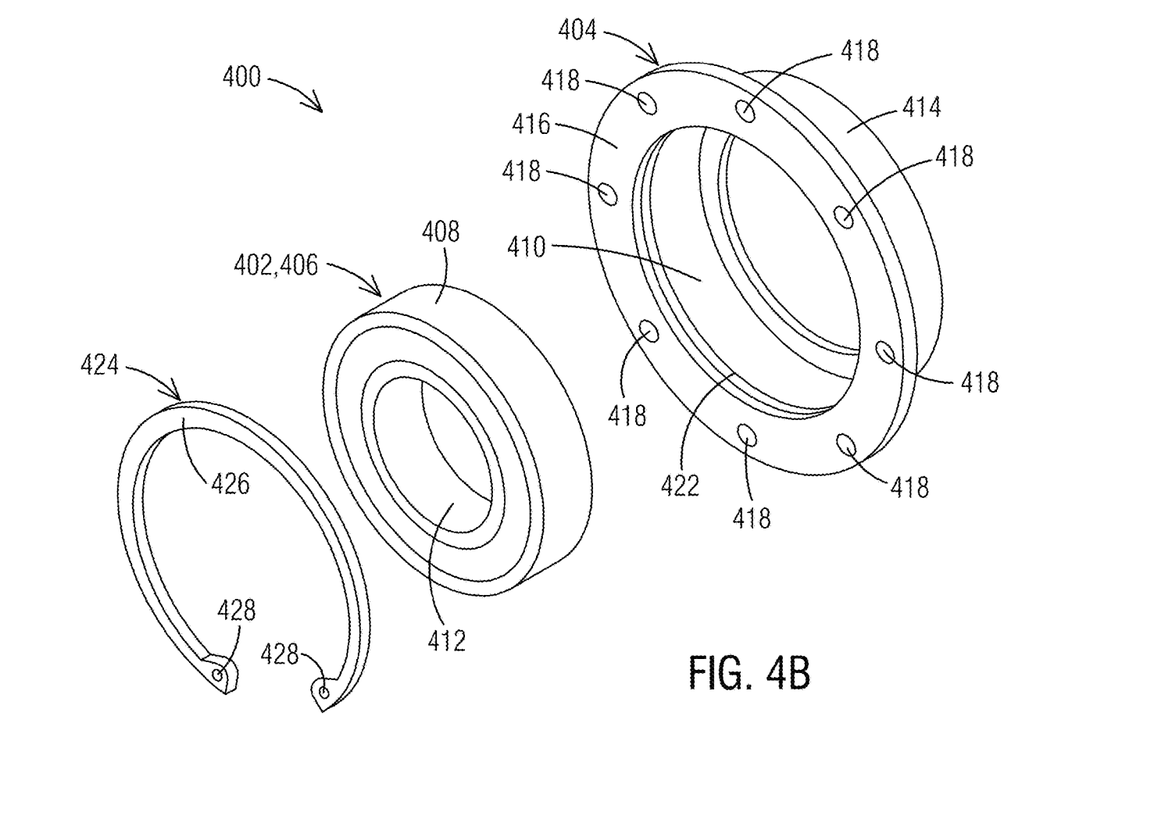

Referring to FIGS. 4A and 4B, there are shown composite and exploded views, respectively, of a bearing carrier assembly 400, which may be supported by the gate mechanism 200 of FIG. 2. Instead of removing internal parts to gain access to the bearing 402 as required by conventional gate mechanisms, the bearing carrier assembly 400 holds or otherwise maintains the bearing 402. The bearing carrier assembly 400 includes a carrier housing 404 and a carrier bearing 406, such as bearing 402 supported in the carrier housing. The carrier bearing 406 is supported within the carrier housing 404 for rotation within the carrier housing. The carrier bearing 406 includes an outer bearing surface 408 that rotates within an inner carrier housing surface 410 and an inner bearing surface 412 for coupling to the shaft 202. The carrier housing 404 has a carrier support 414 having outer dimensions allowing it to mate with a receiving bore of the gate mechanism 200.

The carrier housing 404 includes a carrier flange 416 having multiple apertures or flange fasteners 418. It is to be understood that a fastener, particularly for the bearing carrier assembly, mechanism housing, and that may be discrete from the assembly and housing, may be an extending element (such as a screw, bolt, or pin), a non-extending element (such as a nut or housing opening), or other type of fastener (such as a clip, latch, buckle, tie, clasp, etc.) provided it include the requisite fastening properties as described herein. The carrier housing 404 includes a shoulder 420 to maintain the carrier bearing 406 on one side of the carrier housing, and the carrier housing includes a groove 422 that supports a removable retaining ring 424 to maintains the carrier bearing on another side of the carrier housing. An example of a removable retaining ring 424 is, but is not limited to, a snap ring. The removable retaining ring 424 includes a flexible, arcuate body 426 having ring ends 428 positioned a particular distance from each other when it is not flexed. The ring ends 428 may be flexed closer to each other when inserting the removable retaining ring 424 to, or removing the removable retaining ring from, the groove 422 of the carrier housing 404. In this manner, the bearing carrier assembly 400 supports a bushing of the carrier bearing 406 by the shoulder 420 and the removable retaining ring 424 to prevent movement of the carrier bearing outwards.

Figure 5A:
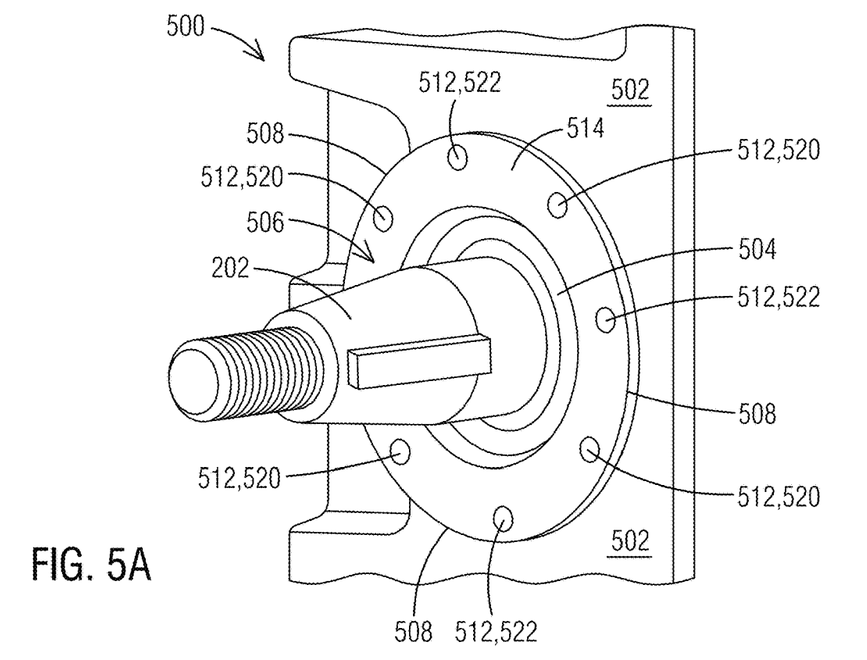
FIGS. 5A and 5B are a perspective and cutaway views, respectively, of the bearing carrier assembly of FIGS. 4A and 4B as positioned at, and away from, the gate mechanism with the bearing retaining plate removed.
Figure 5B:
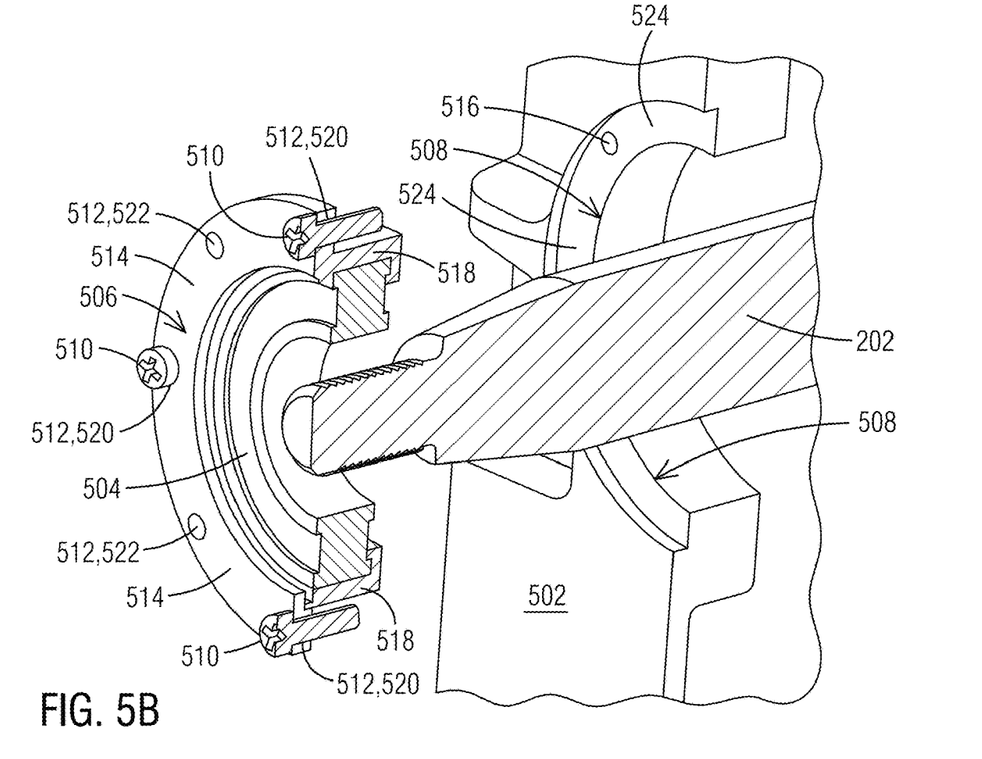

Referring to FIGS. 5A and 5B, there are shown the inner components 500 adjacent to the end portion 300 of the shaft 202, specifically a mechanism housing 502 of the gate mechanism 200. The perspective view of FIG. 5A depicts the bearing carrier assembly as installed at the mechanism housing. The cutaway view of FIG. 5B is an illustrative representation displacing the bearing carrier assembly to facilitate understanding of the aspects of the mechanism housing. If the bearing 504 has a need to be changed in the gate mechanism 200 with the bearing carrier assembly 506, the exterior parts of the gate mechanism are removed to expose the bearing carrier assembly 506 and other inner components 500 (as described above for FIGS. 3A and 3B). The bearing carrier assembly 506 is installed or otherwise positioned over the ends of the shaft 202 and into the mechanism housing 502, thus retaining and supporting it by the housing. The mechanism housing 502 or, more particularly a receiving bore 508 of the mechanism housing, is machined or otherwise formed at dimensions greater than the bearing 504 in order to accommodate the bearing carrier assembly 506. The discrete fasteners 510 pass through flange apertures or flange fasteners 512 (more specifically 520 described below) in the carrier flange 514 and into the housing apertures or housing fasteners 516 in the mechanism housing 502. The carrier flange 514 of the bearing carrier assembly 506 mates to the machined surface of the mechanism housing 502 and limits inward movement, as the carrier support 518 passes further into the mechanism housing.

The carrier flange 514 has a first group 520 of the flange fasteners 512 for discrete fasteners 510 to attach to the mechanism housing 502 and a second group 522 of the flange fasteners that are only used in removing the bearing carrier assembly 506. The bearing carrier assembly 506 withdraws from the mechanism housing 502 in response to removing the discrete fasteners 510 from the first group 520 of the flange fasteners 512 aligned with the housing fasteners 516 and inserting the discrete fasteners to the second group 522 of the flange fasteners 512 aligned with the housing surfaces 524. For some embodiments, the first group 520 of the flange fasteners 512 alternate in position with the second group 522 of the flange fasteners 512. The first group 520 of the flange fasteners 512 are threaded so that they operate in conjunction with the discrete fasteners 510 jack or push the bearing carrier assembly 506 away from the mechanism housing 502 and along the shaft 202.

Figure 6A:
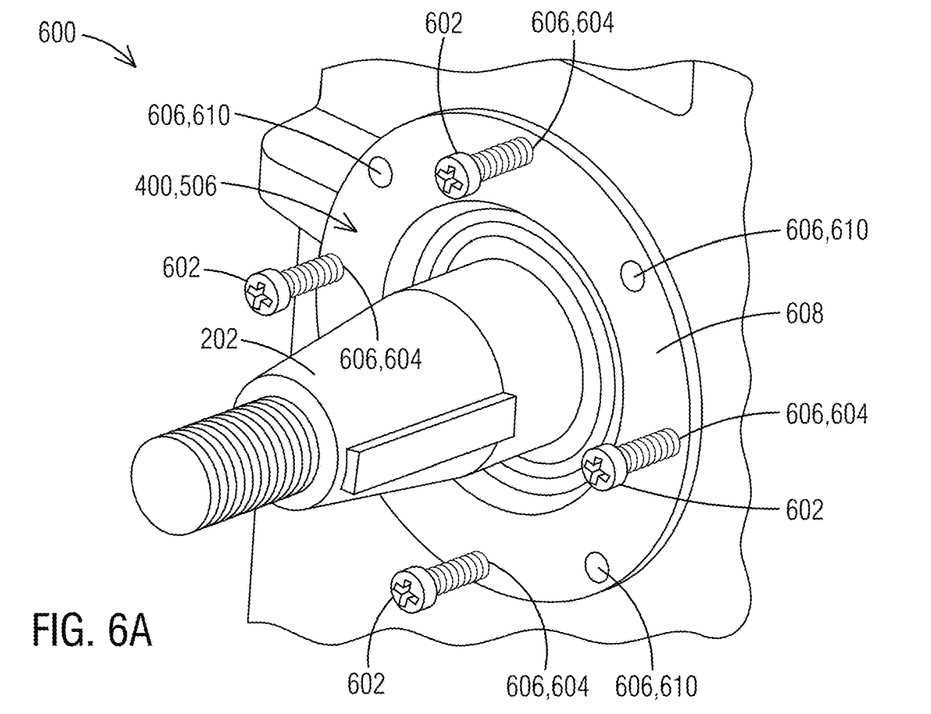
FIGS. 6A and 6B are perspective views of the bearing carrier assembly at intermediate and latter stages of removal from the remainder of the gate mechanism.

Referring to FIG. 6A, there is shown the inner components 600 adjacent to the end portion 300 of the shaft 202, in which the bearing carrier assembly 400, 506 is at an intermediate stage of removal from the remainder of the gate mechanism 200. The discrete fasteners 602 that held the bearing retaining plate (shown as 302 in FIG. 3) in place are now reinstalled into the second group 604 of the flange fasteners 606 of the carrier flange 608. These discrete fasteners 602 have been removed from the first group 610 of the flange fasteners 606. Accordingly, the previously used flange fasteners 606 of the first group 610 in the carrier flange 608 are now visible.

Figure 6B:
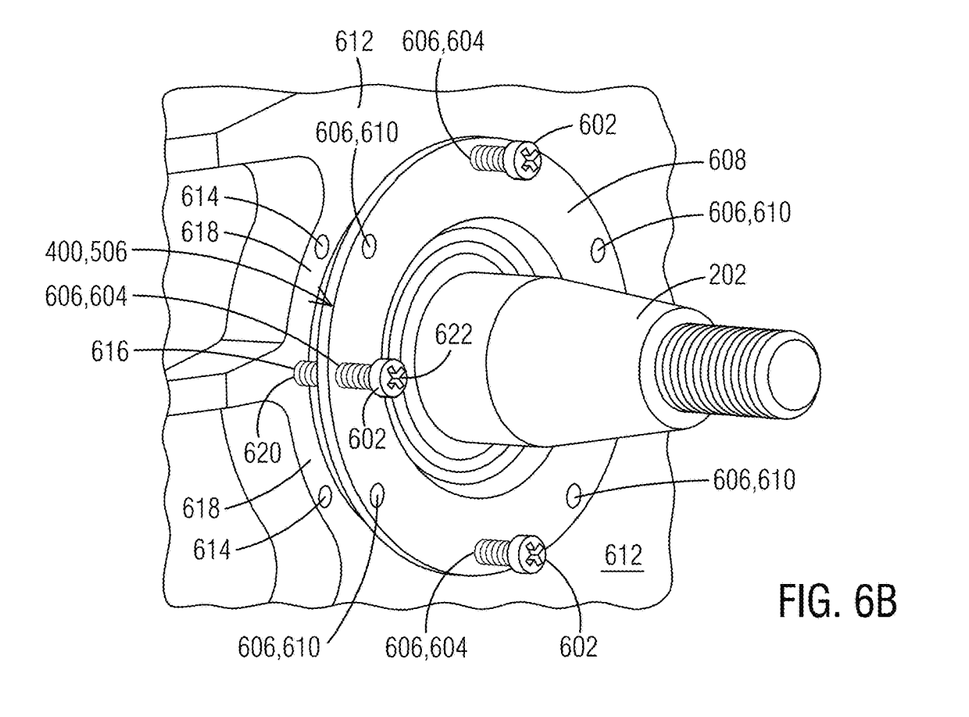

Referring to FIG. 6B, there is shown the inner components 600 adjacent to the end portion of the shaft 202, in which the bearing carrier assembly 400, 506 is at a latter stage of removal from the remainder of the gate mechanism 200. The mechanism housing 612 of the gate mechanism 200 includes housing fasteners 614 and housing surfaces 616 located about a periphery 618 of a receiving bore. The housing surfaces 616 are located about the periphery 618 of the receiving bore offset from the housing fasteners 614. For example, as shown in FIG. 6B, the housing fasteners 614 of the mechanism housing 612 may alternate in position with the positions of the housing surfaces 616 of the mechanism housing. The discrete fasteners 602 have external threads that align with internal threads of the housing fasteners 614 of the mechanism housing 612. The external threads of the discrete fasteners 602 also align with the internal threads of the second group 604 of the flange fasteners 606 of the carrier flange 608. For some embodiments, the external threads of the discrete fasteners 602 may align with the internal threads of the first group 610 of the flange fasteners 606 and, for other embodiments, the external threads of the discrete fasteners do not align with any internal threads of the first group of the flange fasteners, such as flange fasteners that do not have any internal threads. As an example of these latter embodiments, the carrier flange 608 may have alternating threaded holes and through holes in which the second group 604 of the flange fasteners 606 at threaded and the first group 610 of the flange fasteners are not threaded.

The discrete fasteners 602 are threaded through the second group 604 of the flange fasteners 606 until resistance is met at the housing surfaces 616. For example, tightening of each discrete fastener 602 may stop in response to resistance beyond a particular threshold, which may be approximately the thickness of the carrier flange 608. At this point, the end of the discrete fastener 602 is adjacent to the outer surface of the mechanism housing 612, specifically at the housing surface 616. Before reaching the housing surface 616, each discrete fastener may be rotated a little at a time in a cross pattern, or rotated simultaneously, so that the bearing carrier assembly 506 may work its way out toward the end of the shaft 202 and out of the mechanism housing 612. As a result, the bearing carrier assembly 506 withdraws from the mechanism housing 612 in response to removing the discrete fasteners 602 from the first group 610 of the plurality of flange fasteners 606 aligned with the housing fasteners 614 and inserting the discrete fasteners to a second group 604 of the flange fasteners 606 aligned with the housing surfaces 616.

Figure 7:
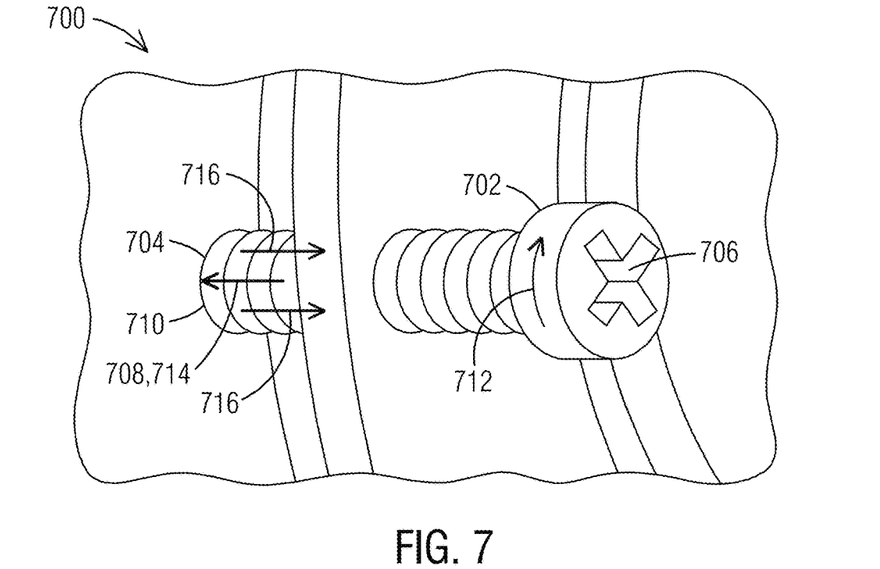
FIG. 7 is a magnified view of a portion of the bearing carrier assembly at the latter stage of FIG. 6B.

Referring to FIG. 7, there is shown a magnified portion 700 of the inner components 600 of FIG. 6B. For some embodiments, each discrete fastener 702 has a fastener surface 704 at a first end and a fastener head 706 at a second end. The fastener head 704 subjects a linear force 708 against the corresponding housing surface 710 when the fastener head 706 receives a rotational force 712. For some embodiments, each discrete fastener 602 has an end portion, such as the portion including the fastener surface 704, that may be positioned within a part of the corresponding housing fastener 614 when aligned with the corresponding housing fastener 614 (shown in FIG. 6B). For some embodiments, each discrete fastener 602 has the end portion may be positioned adjacent to or against the corresponding housing surface 616 when aligned with the corresponding housing surface 616 (shown in FIG. 6B). For some embodiments, the discrete fasteners 602 may apply a first force 714 against the housing surfaces 616 and a second force 716 to the flange fasteners 604, in which the first force is a linear force substantially opposite to the second force.

Referring back to FIG. 6B, the bearing carrier assembly 400, 506 moves out of the receiving bore and away from the mechanism housing 612 as the discrete fasteners 602 are rotated and the fastener surfaces 620, 704 is forced against the housing surfaces 616. Once the inner bearing surface 412 of the carrier bearing 406 (shown in FIG. 4) moves away from the shaft 202, particularly a bearing journal of the shaft, and the bearing carrier assembly 400, 506 is free of the mechanism housing 612, the bearing carrier assembly may be removed by the apparatus from the remainder of the gate mechanism 200. For shafts 202 having a tapered portion near its end, the bearing may be at a slightly smaller diameter of the shaft and may be removed by the apparatus more easily. For some embodiments, the shaft 202 may drop down slightly due to gravitation forces as it is no longer supported by the bearing and the remainder of the bearing carrier assembly 400, 506.

Figure 8A:
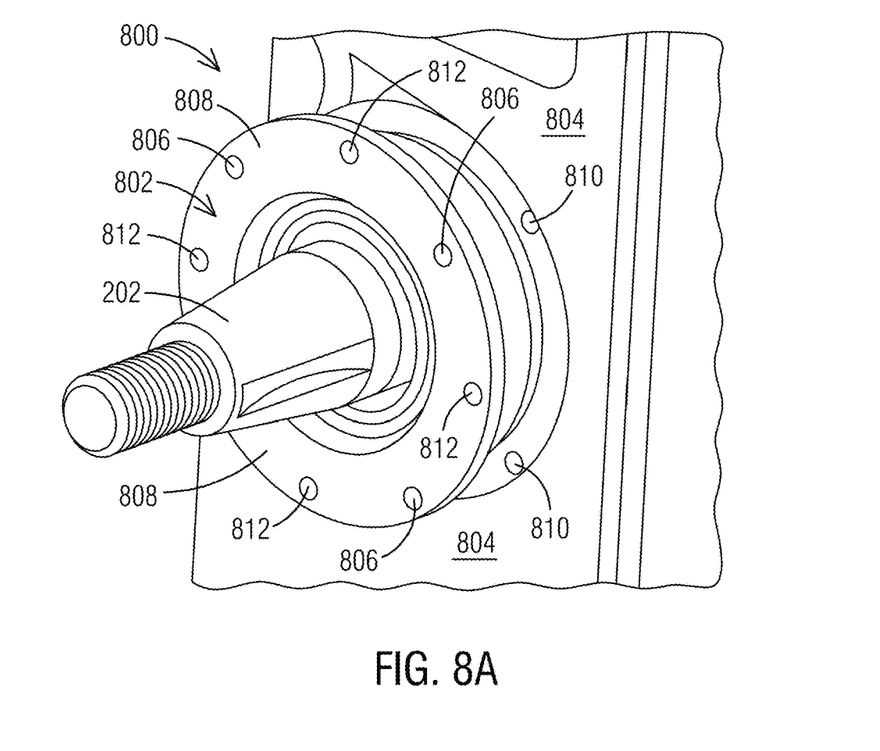
FIG. 8A through 8C are perspective views of the bearing carrier assembly, bearing retaining plate, and their associated components at various stages of attachment to the remainder of the gate mechanism.
Figure 8B:
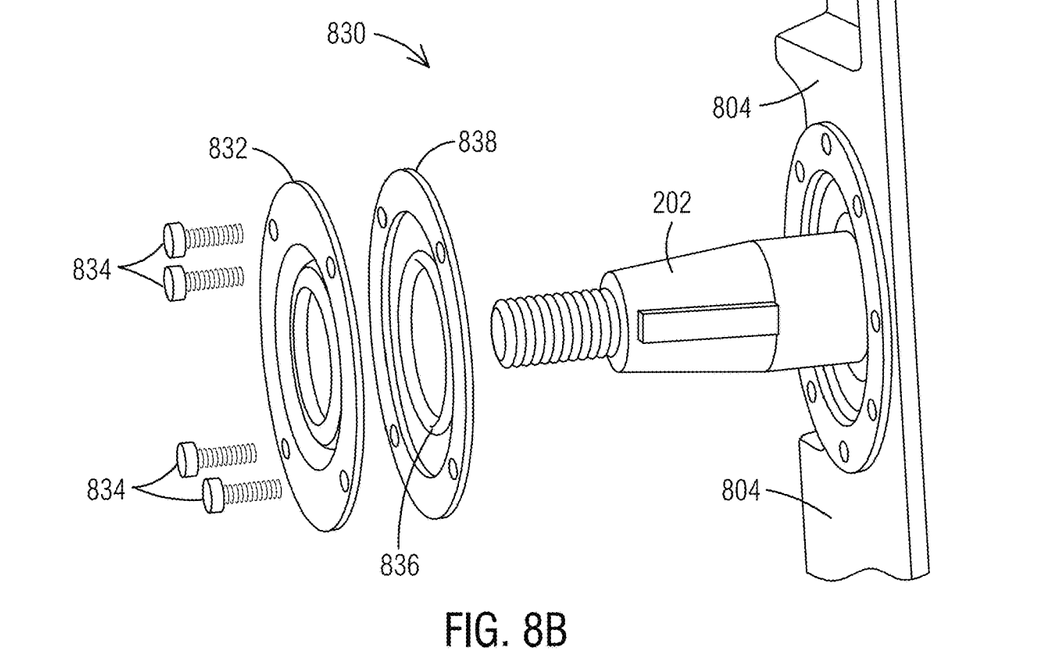
Figure 8C:
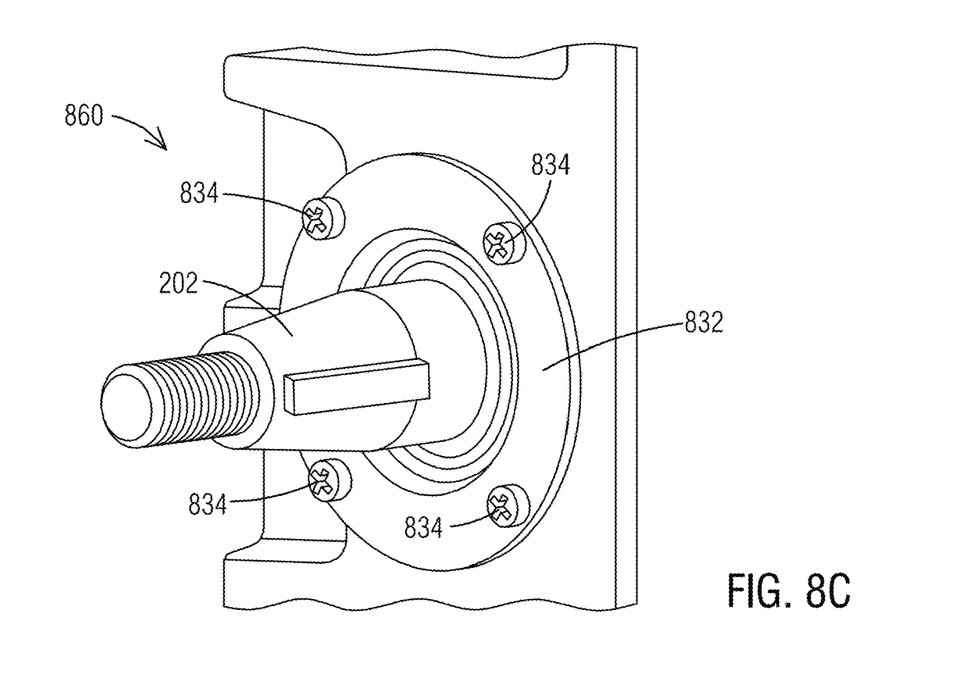

Referring to FIGS. 8A through 8C, there are shown initial attachment stage 800, interim attachment stage 830, and final attachment stage 860 of the bearing carrier assembly 802 and the bearing retaining plate 832 to the remainder of the gate mechanism 200. A new bearing carrier assembly may be attached to the mechanism housing 804, or the existing bearing carrier assembly may include a replaced or repaired bearing and be attached to the mechanism housing. For some embodiments, the discrete fasteners may be reused for the attachment of the bearing carrier assembly 802 to the mechanism housing 804. For such embodiments, the discrete fasteners are removed from the second group 804 of the flange fasteners of the carrier flange 806.

For initial attachment stage 800, the bearing carrier assembly 802 may be installed over the end of the shaft 202 and slide towards the mechanism housing 804. The first group 806 of the flange fasteners of the carrier flange 808 are aligned with the housing fasteners 810 of the mechanism housing 804, and the second group 812 of the flange fasteners of the carrier flange are aligned with the housing surfaces 814 of the mechanism housing 804. If necessary, the shaft 202 may be lifted and aligned with the bearing carrier assembly 802 so that the assembly slides into the mechanism housing 804. For some embodiments, the bearing carrier assembly 802 may be rotated to align the first group 806 of the flange fasteners with the housing fasteners 810 of the mechanism housing 804. For the interim attachment state, the external parts of the gate mechanism 200 including the bearing retaining plate 832 and discrete fasteners 834 are attached to the mechanism housing 804. The discrete fasteners 834 pass through the first group 806 of the flange fasteners of the carrier flange 808 and secure to the housing fasteners 810 of the mechanism housing 804. The external parts may also include other components to facilitate the operation, and otherwise support, the shaft 202 and/or its associated components, such as the O-ring 836 and the seal plate gasket 838, which are also attached to the area around the shaft 202. The final attachment stage 860 represents the exterior of the gate mechanism after attachment of the bearing retaining plate 832 with the discrete fasteners 834. Other parts of the gate mechanism 200 may be attached to the shaft thereafter (such as the support arm, counterweights, conversion bracket, gate arm, etc.) and the gate mechanism may be tested and adjusted before being placed back in service.

Figure 9:
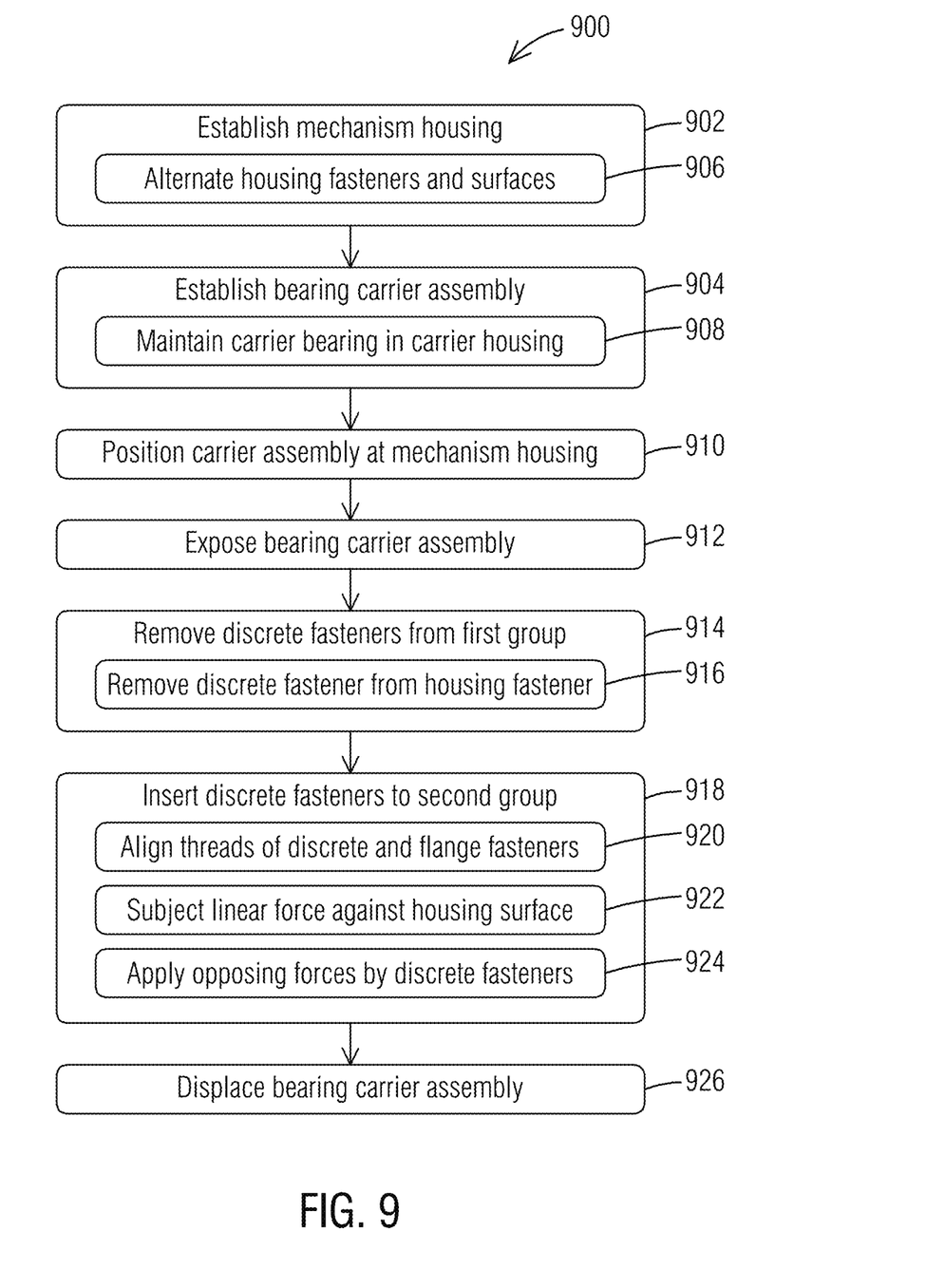
FIG. 9 is a flow diagram of an operation for removal and attachment of the bearing carrier assembly, the bearing retaining plate, and their associated components an example implementation that is operable to employ techniques described herein.

FIG. 9 is a flow diagram of an operation 900 for removal and attachment of the bearing carrier assembly 400, 506, 802, the bearing retaining plate 302, 832, and their associated components an example implementation that is operable to employ techniques described herein. Referring to FIG. 9, in conjunction with FIGS. 3A through 8C, there is shown a method of withdrawing a bearing from a mechanism housing 502, 612, 804 of a gate mechanism 200. A mechanism housing of the gate mechanism and a bearing carrier assembly are established (902, 904). One of either the mechanism housing or the bearing carrier assembly may be established before the other, or they may be established at the same time. Both the mechanism housing and the bearing carrier assembly must be established in order to proceed with the remainder of the operation 900. For some embodiments, the mechanism housing may be established by alternating housing fasteners with housing surfaces about the perimeter of the mechanism housing (906). For example, the mechanism housing may have the same number of housing fasteners as housing surfaces and space them apart equally in a radial orientation. For some embodiments, the bearing carrier assembly may be established by maintaining a bearing, such as a carrier bearing, in a carrier housing of the bearing carrier assembly (908). For some embodiments, the carrier bearing may be maintained with a first shoulder of the carrier housing on one side of the carrier housing and a removable retaining ring supported by a second shoulder of the carrier housing on another side of the carrier housing.

The mechanism housing 502, 612, 804 includes a receiving bore, housing fasteners, and housing surfaces, in which the housing fasteners are located about a periphery of the receiving bore and the housing surfaces are located about the periphery of the receiving bore offset from the housing fasteners. The bearing carrier assembly 400, 506, 802 includes a carrier housing and a carrier bearing, in which the carrier bearing is supported within the carrier housing for rotation within the carrier housing and the carrier housing has a carrier support mating with the receiving bore. The carrier housing has flange fasteners that may be aligned with the housing fasteners and the housing surfaces when the carrier housing mates with the receiving bore. The above configurations of the mechanism housing and the bearing carrier assembly are in accordance with the descriptions provided above in reference to FIGS. 3A through 8C.

Subsequent to establishing both the mechanism housing 502, 612, 804 (902) and the bearing carrier assembly 400, 506, 802 (904), the operation 900 positions the bearing carrier assembly and the mechanism housing (910). In particular, as described above in reference to FIG. 8, the bearing carrier assembly is positioned at the mechanism housing and discrete fasteners secure the bearing carrier assembly at that position. In particular, the discrete fasteners pass through the first group 806 of the flange fasteners and secure to the housing fasteners 810 of the mechanism housing 804. Thus, at some point before removing the discrete fasteners the carrier housing is mated with the receiving bore, the flange fasteners are aligned with the housing fasteners and the housing surfaces, and the discrete fasteners are inserted to the first group of the flange fasteners aligned with the housing fasteners.

Subsequent to positioning the bearing carrier assembly at the mechanism housing of the gate mechanism (902, 904), the bearing will need to be withdrawn from the gate mechanism for review, replacement, or repairs. The operation 900 proceeds with withdrawing the bearing by exposing the bearing carrier assembly (912) as explained above in reference to FIGS. 3A and 3B. The discrete fasteners are removed from a first group of the flange fasteners aligned with the housing fasteners and the external parts are removed from the mechanism housing and displaced from the area around the shaft. The removed external parts include, but are not limited to, a bearing retaining plate, an O-ring, and a seal plate gasket.

Subsequent to exposing the bearing carrier assembly (912), the operation 900 removes the discrete fasteners from the mechanism housing (914) if they have not been already removed. For example, the discrete fasteners may be removed from the first group of the flange fasteners aligned with the housing fasteners (916). For some embodiments, an end portion of each discrete fastener positioned within a part of the corresponding housing fastener may be removed, and the end portion may be exerted against the corresponding housing surface of the mechanism housing.

Subsequent to removing the discrete fasteners from the mechanism housing, the operation 900 may insert the discrete fasteners to the second group of the flange fasteners aligned with the housing surfaces (918), in contrast to the housing fasteners. For some embodiments, external threads of the discrete fasteners may be aligned with internal threads of at least one of the flange fasteners of the carrier housing (920). As described above, some flange fasteners may have through holes without internal threads for some embodiments, and all flange fasteners may have internal threads for other embodiments. For some embodiments, a linear force of a fastener surface of each discrete fastener may be subjected against the corresponding housing surface when the fastener head of the discrete fastener receives a rotational force (922). For some embodiments, a first force by the discrete fasteners may be applied against the housing surfaces and a second force may be applied to the flange fasteners, in which the first force is a linear force substantially opposite in direction to the second force (924). The directional forces resulting from insertion of the discrete fasteners is also explained above in reference to FIG. 7.

In response to inserting the discrete fasteners to the second group of flange fasteners aligned with the housing surfaces of the mechanism housing (918), the operation 900 displaces the bearing carrier assembly from the mechanism housing (926).

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method of withdrawing of a bearing from a mechanism housing of a gate mechanism, the method comprising:
   establishing a mechanism housing of the gate mechanism including a receiving bore, a plurality of housing fasteners, and a plurality of housing surfaces, the plurality of housing fasteners being located about a periphery of the receiving bore, and the plurality of housing surfaces located about the periphery of the receiving bore offset from the plurality of housing fasteners;
   establishing a bearing carrier assembly including a carrier housing and a carrier bearing, the carrier bearing being supported within the carrier housing for rotation within the carrier housing, the carrier housing having a carrier support mating with the receiving bore, the carrier housing having a plurality of flange fasteners aligning with the plurality of housing fasteners and the plurality of housing surfaces when the carrier housing mates with the receiving bore;

removing a plurality of discrete fasteners from a first group of the plurality of flange fasteners aligned with the plurality of housing fasteners; and displacing the bearing carrier assembly from the mechanism housing in response to inserting the plurality of discrete fasteners, removed from the first group of the plurality of flange fasteners, to a second group of the plurality of flange fasteners aligned with the plurality of housing surfaces.

2. The method as described in claim 1, further comprising, before removing the plurality of discrete fasteners:

mating the carrier housing with the receiving bore;

aligning the plurality of flange fasteners with the plurality of housing fasteners and the plurality of housing surfaces; and inserting the plurality of discrete fasteners to the first group of the plurality of flange fasteners aligned with the plurality of housing fasteners.

3. The method as described in claim 1, wherein establishing the mechanism housing includes alternating in position the plurality of housing fasteners with the plurality of housing surfaces.

4. The method as described in claim 1, wherein establishing the bearing carrier assembly includes maintaining the carrier bearing with a shoulder of the carrier housing on one side of the carrier housing and a removable retaining ring supported by a groove of the carrier housing on another side of the carrier housing.

5. The method as described in claim 1, wherein inserting the plurality of discrete fasteners includes subjecting a linear force of a fastener surface of each discrete fastener of the plurality of discrete fasteners against the corresponding housing surface when the fastener head of the discrete fastener receives a rotational force.

6. The method as described in claim 1, wherein inserting the plurality of discrete fasteners includes applying a first force by the plurality of discrete fasteners against the plurality of housing surfaces and a second force to the plurality of flange fasteners, the first force being a linear force substantially opposite to the second force.

* * * * *